US012672047B2

(12) United States Patent
Hashmi et al.

(10) Patent No.: US 12,672,047 B2
(45) Date of Patent: Jun. 30, 2026

(54) FACILITATING ENERGY AWARE MULTI-CELL ADMISSION CONTROL IN ADVANCED COMMUNICATION NETWORKS

(71) Applicant: Dell Products L.P., Round Rock, TX (US)

(72) Inventors: Umair Sajid Hashmi, Mississauga (CA); Gwenael Poitau, Montreal (CA); Jeebak Mitra, Ottawa (CA); Marwan Mansour, Smouha (EG)

(73) Assignee: DELL PRODUCTS L.P., Round Rock, TX (US)

( * ) Notice: Subject to any disclaimer, the term of this patent is extended or adjusted under 35 U.S.C. 154(b) by 585 days.

(21) Appl. No.: 18/336,230

(22) Filed: Jun. 16, 2023

(65) Prior Publication Data

US 2024/0422650 A1      Dec. 19, 2024

(51) Int. Cl.
*H04W 48/02* (2009.01)
*H04W 24/02* (2009.01)
(Continued)

(52) U.S. Cl.
CPC ........... *H04W 48/02* (2013.01); *H04W 24/02* (2013.01); *H04W 48/14* (2013.01); *H04W 52/0206* (2013.01); *H04W 88/12* (2013.01)

(58) Field of Classification Search
CPC ..... H04W 48/02; H04W 24/02; H04W 48/14; H04W 52/0206; H04W 88/12
See application file for complete search history.

(56) References Cited

U.S. PATENT DOCUMENTS 11,297,587 B2 *   4/2022   Zhu ........................ H04W 76/10
12,107,728 B2 *  10/2024   Yeh ..................... H04L 41/5025
(Continued)

FOREIGN PATENT DOCUMENTS

WO       2019/138359 A1     7/2019
WO       2021/232852 A1    11/2021

OTHER PUBLICATIONS

International Search Report and Written Opinion received for PCT Application Serial No. PCT/US2023/036194 dated Mar. 18, 2024, 16 pages.
(Continued)

*Primary Examiner* — Parth Patel
(74) *Attorney, Agent, or Firm* — Amin, Turocy & Watson, LLP

(57)      ABSTRACT

Facilitating energy aware multi-cell admission control in advanced communication networks is provided herein. A method includes, based on notification of a denial of an admission request by a first cell, facilitating a transmission of the admission request to a second cell and at least a third cell. The second cell and the third cell are neighbor cells of the first cell. The admission request can be received from a user equipment. The method also includes, based on receipt of an acceptance of the admission request from the second cell and the third cell, and based on a determination that a first utility of the second cell is higher than a second utility of at least the third cell, selecting the second cell as an admission cell for the user equipment. Further, the method includes facilitating admission of the user equipment to a cell cluster via the second cell.

20 Claims, 10 Drawing Sheets

(51) Int. Cl.

| | |
|---|---|
| *H04W 48/14* | (2009.01) |
| *H04W 52/02* | (2009.01) |
| *H04W 88/12* | (2009.01) |

(56) References Cited

U.S. PATENT DOCUMENTS

| | | | | |
|---|---|---|---|---|
| 12,232,003 | B2 * | 2/2025 | Song | H04W 4/60 |
| 12,543,153 | B2 * | 2/2026 | Nalla | H04W 68/04 |
| 2014/0248897 | A1 * | 9/2014 | Sfar | H04W 28/24 |
| | | | | 455/453 |
| 2018/0376380 | A1 * | 12/2018 | Leroux | H04W 4/70 |
| 2019/0191351 | A1 * | 6/2019 | Chong | H04B 17/327 |
| 2019/0373513 | A1 | 12/2019 | Chen | |
| 2021/0377116 | A1 * | 12/2021 | Yeh | H04W 24/10 |
| 2022/0014963 | A1 * | 1/2022 | Yeh | H04W 28/0268 |
| 2022/0322172 | A1 * | 10/2022 | Parekh | H04W 36/0094 |
| 2022/0361086 | A1 * | 11/2022 | Wang | H04W 40/12 |
| 2022/0407664 | A1 * | 12/2022 | Wang | H04W 16/04 |
| 2023/0232304 | A1 * | 7/2023 | Maharana | H04W 88/06 |
| | | | | 370/331 |
| 2023/0413126 | A1 * | 12/2023 | Bunde | H04W 36/0033 |
| 2024/0015790 | A1 * | 1/2024 | Jamadagni | H04W 24/02 |
| 2024/0224175 | A1 * | 7/2024 | Karaki | H04W 28/0221 |
| 2024/0250904 | A1 * | 7/2024 | Shete | H04L 45/505 |
| 2024/0349285 | A1 * | 10/2024 | Saad | H04W 72/0453 |
| 2024/0381066 | A1 * | 11/2024 | Barton | H04W 8/02 |
| 2024/0422650 | A1 * | 12/2024 | Hashmi | H04W 24/02 |
| 2025/0063559 | A1 * | 2/2025 | D'Oro | H04W 72/046 |
| 2025/0310209 | A1 * | 10/2025 | Essigmann | H04L 41/14 |
| 2026/0020011 | A1 * | 1/2026 | Samuel | H04W 72/12 |
| 2026/0037867 | A1 * | 2/2026 | Ueda | G06N 20/00 |

OTHER PUBLICATIONS

NGMN Alliance "Green Future Networks—Network Energy Efficiency" v1.1 www.ngmn.org, Dec. 7, 2021, 56 pages.

Ali Imran, et al. "Challenges in 5G: How to Empower SON with Big Data for Enabling 5G" IEEE Network, vol. 28, No. 6, pp. 27-33, Nov.-Dec. 2014, doi: 10.1109/MNET.2014.6963801, 8 pages.

3GPP TSG-SA5 Meeting #138-e, Nokia, Nokia Shanghai Bell, Combination of Key issues, e-meeting, Aug. 23-31, 2021.

Qi et al., "Intent-Aware Multi-Agent Reinforcement Learning," 2018 IEEE International Conference on Robotics and Automation (ICRA), Brisbane, QLD, Australia, 2018, pp. 7533-7540, doi: 10.1109/ICRA.2018.8463211.

D'Oro et al., "dApps: Distributed Applications for Real-time Inference and Control in O-RAN," in IEEE Communications Magazine, doi: 10.1109/MCOM.002.2200079.

Nguyen et al., "Transfer Learning for Wireless Networks: A Comprehensive Survey," in Proceedings of the IEEE, vol. 110, No. 8, pp. 1073-1115, Aug. 2022, doi: 10.1109/JPROC.2022.3175942.

Borgwardt et al., "Integrating structured biological data by kernel maximum mean discrepancy," Bioinformatics, vol. 22, No. 14, pp. 49-57, Jul. 2006.

Kullback et al., "On information and sufficiency," Ann. Math. Statist., vol. 22, No. 1, pp. 79-86, 1951.

Shen et al., "Wasserstein distance guided representation learning for domain adaptation," in Proc. 32nd AAAI Conference on Artificial Intelligence, New Orleans, Feb. 2018, pp. 4058-4065.

Zellinger et al., "Central moment discrepancy (CMD) for domaininvariant representation learning," in Proc. 5th International Conference on Learning Representations, Toulon, Apr. 2017, pp. 1-13.

Wang et al., "Dueling network architectures for deep reinforcement learning," in Proc. Int. Conf. Mach. Learn., Jun. 2016, pp. 1-6.

International Preliminary Report on Patentability received for PCT Application Serial No. PCT/US2023/036194 dated Dec. 26, 2025, 10 pages.

\* cited by examiner $$\max \sum_{t=0}^{t=T-1} \frac{(User\ Admission\ Rate_t)}{(Power\ Consumption\ Factor_t)}; \forall c \in C$$

such that $$SINR_c > SINR_{c,thresh,c}$$
$$Delay_c < DelayThresh_c$$

FIG. 2

$$R^t = \begin{cases} e^{\zeta(u^t - 1)}; \text{ for valid action} \\ Z; \text{ for invalid action} \end{cases}; \zeta > 1, Z \in [-1, 0] \qquad (2)$$

FIG. 7A where $$u^t = \sum_{t=0}^{t=T-1} \frac{(\text{User Admission Rate}_t)^\alpha}{(\text{Power Consumption Factor}_t)^\gamma} (\text{QoS Satisfaction Rate}_t)^\beta; \alpha + \beta + \gamma = 1 \qquad (3)$$

FIG. 7B

$$u^t = \sum_{t=0}^{t=T-1} \left[\frac{1}{1 + RS(t)}\right]^{\alpha} [QoS\ Satisfaction\ Rate]^{1-\alpha}, \alpha < 1 \qquad (4)$$

FIG. 8A

$$RS(t) = \left| \frac{\left(\sum_{m=1}^{N} 2^{r_m(t)}\right) - N(t)}{N(t)} \right| \qquad (5)$$

FIG. 8B

FACILITATING ENERGY AWARE MULTI-CELL ADMISSION CONTROL IN ADVANCED COMMUNICATION NETWORKS

BACKGROUND

The use of computing devices is ubiquitous. Given the explosive demand placed upon mobility networks and the advent of advanced use cases (e.g., streaming, gaming, and so on), power consumption in such networks is higher as compared to Long Term Evolution (LTE) networks, for example. Such power consumption can be attributed to the exponential increase in the network traffic flowing through the advanced network and the need for faster processing of complex tasks. Accordingly, unique challenges exist related to network efficiency and in view of forthcoming Fifth Generation (5G), new radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a method is provided that includes, based on notification of a denial of an admission request by a first cell of a cell cluster, facilitating, by a system comprising a processor, a transmission of the admission request to a second cell and at least a third cell of the cell cluster. Although discussed with respect to three cells, in implementation more than three cells can be utilized with the disclosed embodiments. The second cell and the third cell are neighbor cells of the first cell. The admission request can be received from a user equipment. The method also includes, based on receipt of an acceptance of the admission request from the second cell and the third cell, and based on a determination that a first utility of the second cell is higher than a second utility of at least the third cell, selecting, by the system, the second cell as an admission cell for the user equipment. Further, the method includes facilitating, by the system, admission of the user equipment to the cell cluster via the second cell.

In some implementations, the method can include, based on the receipt of the acceptance and after the admission of the user equipment to the cell cluster, evaluating, by the system, an optimization function that is a combination of a number of user equipment served, comprising the user equipment, a power consumption, and a quality of service satisfaction rate. Further, the method can include, based on the evaluating, applying, by the system, a reward value to information used as input to respective models associated with the first cell, the second cell, and the third cell. In an example, the respective models can be reinforcement learning based models.

Further to the above implementations, applying the reward value can include, based on at least the quality of service satisfaction rate being determined to satisfy a defined threshold, assigning, by the system, a first value as the reward value. In addition, the method can include, based on at least the quality of service satisfaction rate being determined to fail to satisfy the defined threshold, assigning, by the system, a second value as the reward value. The second value is less than the first value.

In an alternative or additional implementation, the denial of the admission request can be a first denial of the admission request. Further to this implementation, the method can include, based on a second denial of the admission request received from the second cell and a third denial of the admission request received from the third cell, applying, by the system, a penalty to information used as input to respective models associated with the first cell, the second cell, and the third cell.

According to some implementations, the method can include, prior to the selecting and based on the user equipment being admitted to the second cell, determining the first utility of the second cell based on an expected first power consumption of the second cell and a first predicted quality of service for the user equipment. Further, the method can include, based on the user equipment being admitted to the third cell, determining the second utility of the third cell based on an expected second power consumption of the third cell and a second predicted quality of service for the user equipment.

In some implementations, the system can be implemented within a disaggregated architecture that comprises central units, distributed units, and a near-real-time-radio access network intelligent controller.

Another embodiment relates to a system that includes a processor and a memory that stores executable instructions that, when executed by the processor, facilitate performance of operations. The system can include a first central unit of a first cell that receives, from a radio unit, a connection request from a user equipment. A distributed application deployed by the first central unit denies the connection request. The system can also include a near-real-time-radio access network intelligent controller (near-RT-RIC) comprising a memory and a processor, wherein the near-RT-RIC receives, from the first central unit, a notification of a denial of the connection request, and forwards the connection request to a second central unit of a second cell and at least a third central unit of at least a third cell. The second cell and at least the third cell are nearest neighbor cells of the first cell. Further, based on respective affirmative responses from the second cell and at least the third cell and respective utility functions of the second cell and at least the third cell, the near-RT-RIC selects the second cell for admission of the user equipment at the second cell. In an example, the near-RT-RIC, based on selection of the second cell, conveys, to the user equipment, a redirect message that identifies the second cell.

In an implementation, a cell cluster comprises the first cell, the second cell, and at least the third cell. Further to this implementation, the near-RT-RIC, based on receipt of the respective affirmative responses and after the admission of the user equipment to the cell cluster, evaluates an optimization function that is a combination of a number of user equipment served, comprising the user equipment, a power consumption, and a quality of service satisfaction rate. In addition, based on the evaluating, the near-RT-RIC applies a reward value to information used as input to respective models associated with the first cell, the second cell, and the third cell.

According to an implementation, based on at least the quality of service satisfaction rate being determined to satisfy a defined threshold, the near-RT-RIC assigns a first value as the reward value. In addition, based on at least the quality of service satisfaction rate being determined to fail to satisfy the defined threshold, the near-RT-RIC assigns a second value as the reward value, wherein the second value is less than the first value.

In some implementations, based on respective negative responses from the second cell and at least the third cell, the near-RT-RIC provides information indicative of a penalty value to inputs of respective reinforcement learning models of the first central unit, the second central unit, and at least the third central unit.

According to an implementation, the first central unit comprises a first model, the second central unit comprises a second model, and at least the third central unit comprises at least a third model. The first model, the second model, and the third model are trained, to a defined confidence level, to facilitate admission control for maximizing a quantity of user equipment being admitted based on defined energy consumption parameters. Further, the first model, the second model, and the third model, can be deep reinforcement learning models.

In some implementations, the system can be deployed in a disaggregated architecture. According to some implementations, the first central unit, the second central unit, at least the third central unit, and the near-RT-RIC are arranged in a non-co-located deployment. In an alternative implementation, the first central unit, the second central unit, the third central unit, and the near-RT-RIC are arranged in a non-co-located deployment.

According to another embodiment, provided herein is a non-transitory machine-readable medium, comprising executable instructions that, when executed by a processor of network equipment, facilitate performance of operations. The operations can include, based on a request from a user equipment for admission into a cell cluster being denied by a requested cell, notifying alternative cells of the cell cluster of the request for the admission. The alternative cells are determined to be nearby cells of the requested cell. The operations can also include, based on at least one alternative cell of the alternative cells accepting the request, sending, to the user equipment, first information indicative of a redirection to the at least one alternative cell. Further, the operations can include sending, to the at least one alternative cell, second information indicative of a selection of the at least one alternative cell for admission of the user equipment.

In some implementations, the operations can include evaluating an optimization function that is a combination of a number of user equipment served, comprising the user equipment, a power consumption, and a quality of service satisfaction rate. The operations can also include, based on the evaluating, applying a reward value to information used as input to respective models associated with the requested cell and the alternative cells.

According to some implementations, the operations can include, based on no alternative cell of the alternative cells accepting the request, sending, to the user equipment, third information indicative of denial of the request for the admission into the cell cluster. Further to these implementations, the operations can include sending, to the requested cell and the alternative cells, fourth information indicative of a penalty. The penalty can be utilized as input to respective models of the requested cell and the alternative cells. Further, the respective models can be reinforcement learning based models.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which:

FIG. 2 illustrates a first equation (1) for a user admission rate in accordance with one or more embodiments described herein;

FIG. 7A illustrates a second equation (2) for a long-term reward function in accordance with one or more embodiments described herein;

FIG. 7B illustrates a third equation (3) for assigning a priority coefficient to each performance indicator in accordance with one or more embodiments described herein;

FIG. 8A illustrates a fourth equation (4) for modifying the utility within the reward function in accordance with one or more embodiments described herein;

FIG. 8B illustrates a fifth equation (5) for mathematically expressing the rejection score in accordance with one or more embodiments described herein;

DETAILED DESCRIPTION

Figure 1:
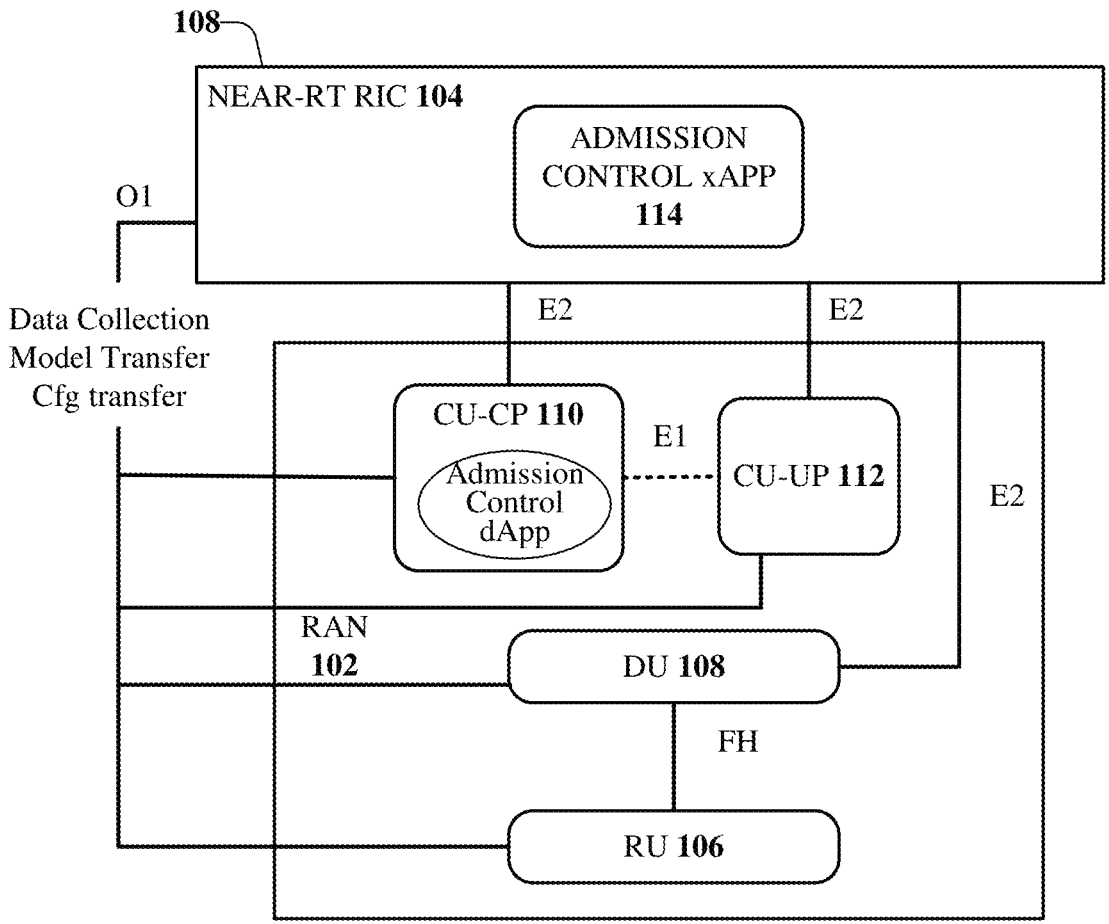
FIG. 1 illustrates an example, non-limiting, system architecture for multi-cell user equipment admission control in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

The high energy consumption of 5G networks (and other advanced networks) is a source of concern for various reasons. For example, the high energy consumption can increase the operators' operational expenditure (OPEX). In another example, the high energy consumption can increase carbon dioxide ($CO_2$) emissions, which can be in direct conflict with environmentally friendly policies adopted by governments and companies around the globe. It is noted that static energy saving techniques are not applicable to mobile networks that have fluctuating traffic loads, fluctuating traffic types, and user mobility patterns. Multiple energy saving (ES) features, such as deep sleep mode, carrier shut down, and radio frequency (RF) channels' switch off can be available. However, due to the large parameter space involved in the energy minimization process, the ensuing optimization problem becomes non-polynomial-hard (NP-hard), which utilizes significant computation for yielding optimal parameters.

Recently, ES on shorter time scales have been proposed in academia as well as industry standards. These proposals include at symbol-level, subframe-level, and/or frame-level advanced sleep modes (ASM). The challenge for mobile operators, as well as standardization bodies, is to streamline processes for energy efficiency (EE) specific use cases, such as activation and/or deactivation of sleep mode functionality and site energy management.

To overcome the above as well as related issues, the data driven approaches discussed herein can outperform classical optimization techniques in terms of performance and real-time inferences. Provided are techniques for leveraging artificial intelligence (AI) and/or machine learning (ML) for EE with negligible impact on the user Quality of Experience (QoE), which, until now, has been an unexplored field of knowledge as it relates to communication networks.

A concern for future networks (5G, 6G, NR, and beyond) is catering to a higher number of user equipment (UEs) while meeting the diverse quality of service (QOS) demands of the UEs. To this and related ends, provided herein is a multi-cell optimization framework which ensures that more UEs are served by the network while ensuring high QoS to the UEs. The disclosed embodiments leverage reinforcement learning and other AI techniques (e.g., transfer learning, federated learning, and/or intent based learning) to solve the problem of maximizing the number of served UEs while minimizing the QoS violations.

Although 5G networks can have some inherent enhanced efficiency, the power consumption for 5G networks is higher than the power consumption for other networks, such as Long Term Evolution (LTE) networks. The higher power consumption in 5G networks is due to the exponential increase in the traffic flowing through the network and the need for faster processing of complex tasks. Sustainable network design is thus important for current and future networks.

Without any control on the number of UEs admitted to a cell, the QoS experienced at the UEs can deteriorate as the number of UEs served by a cell can saturate the capacity of the cell. There are some measures that have been considered in network operation. One measure has been a process and criteria for setting the maximum number of UEs that can use a network slice (NS) simultaneously as part of NS admission control. Another measure is that operators may set counters at the Radio Resource Control (RRC) level to control the maximum number of UEs in a cell.

Recently some data-driven solutions based on a dynamic threshold have emerged. However, their decisions are applied per single cell and may lead to denial-of-service for rejected UEs and/or network load imbalances. Accordingly, the disclosed embodiments provide a solution to the problem of network wide user admission control with the target of admitting a maximum number of UEs served within QoS constraints.

Further, the disclosed embodiments can be utilized to solve an admission control problem. For example, the disclosed embodiments can target multiple various performance indicators (also referred to as key performance indicators (KPIs)). Such performance indicators include, but are not limited to, maximizing the number of UEs served within the network while meeting service delay and QoS constraints for a diverse class of UEs in a cluster of cells. Additionally, from implementation and deployment perspectives, the disclosed embodiments can determine the necessary control flow between elements of a disaggregated architecture. Such control flow includes flow of statistics between network equipment, model training, model deployment, and user admission control and traffic steering configuration from various network automation tools.

FIG. 1 illustrates an example, non-limiting, system architecture 100 for multi-cell user equipment admission control in accordance with one or more embodiments described herein. As mentioned, the disclosed embodiments, including the admission control, can be within various types of disaggregated architecture.

It is noted that for purposes of explanation, an O-RAN framework will be discussed. However, the disclosed embodiments are not limited to an O-RAN framework implementation and, instead, other types of disaggregated architecture can be utilized with the various embodiments discussed herein. Further, as it relates to the O-RAN framework, the network equipment can include, but is not limited to, O-RAN Radio Units (O-RUs) and Random Access Network Intelligent Controllers (RICs). Further, the network automation tools include, but are not limited to, an rApp and an xApp.

As discussed herein, provided is a data-driven UE admission control solution that maximizes UE admission by dynamically balancing the network load while limiting its energy consumption. An objective for the multi cell UE admission control application is to admit a maximum number of UEs that request service within the allowed QoS constraints defined for each class of UE. For a cluster of Radio Units (RU) cells managed by a near real-time RIC (near-RT-RIC or nRT-RIC), the optimization can be performed for a longer time frame than real-time algorithms (e.g., L2 scheduling) and for the entire cell space.

FIG. 2 illustrates a first equation (1) for the user admission rate in accordance with one or more embodiments described herein. The user admission rate is the percentage of UEs accepted (or admitted) in the network after receiving respective RRC requests from the UEs. The power consumption factor is the ratio of power consumed by the network during a time instance and the maximum power consumption at highest load and without any power saving measure. C is the set of device classes in the network. The device classes can be related to different 5G use cases, such as enhanced mobile broadband (eMBB) devices for high data volume and throughput needs, ultra-reliable low latency communication (URLLC) devices for access delay or latency sensitive devices, and massive machine type communication (mMTC) for internet of things (IoT) and/or internet of everything (IoE) based device types. The target is to maximize the number of served UEs over an interval of T slots while ensuring that the mean (or a defined percentile) of the UE signal-to-interference-and-noise ratio (SINR) over T slots remain above the set threshold for that class of UE. The same constraints apply to the delay which is critical for URLLC based devices.

With reference again to FIG. 1, provided are a RAN 102 and a near-RT-RIC 104. A network model in FIG. 1 assumes one or more RUs 106 connected with associated one or more RAN Data Units (DUs 108) and one or more RAN Control Units (CUs), illustrated as a CU control plane (CU-CP 110) and a CU-user plane (CU-UP 112). The DUs 108 and CUs are connected to a regional cloud that includes the near-RT-RIC 104. In this system architecture 100, two scenarios can be considered (i) a one to one relationship between the CU and the DU, and (ii) multiple CUs to be connected with a single near-RT RIC. The near-RT-RIC 104 supports an xApp 114 responsible for coordinated UE admission and QoS control of multiple cells within its footprint.

While model training, cell level coordination and message control between cells is performed by the near-RT-RIC 104, the inference model for the application is deployed in the Control Unit (CU) layer using the notion of dApps (distributed applications). dApps are different from xApps in terms of their turnaround time and placement at lower layers as compared to xApps and rApps within the disaggregated architecture. Therefore, there is a level of intelligence that executes at a level lower than the near-RT RIC. The function of dApps within the disaggregated architecture is to collect real-time data from the RAN, as well as function guidance from RICs to execute lower-layer functionalities in real-time. Thus, the dApps allow for real-time data inspired network management at the CU and/or DU granularity.

It should be noted that terms such as "real-time," "near real-time," "dynamically," "instantaneous," "continuously," and the like can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Figure 3:
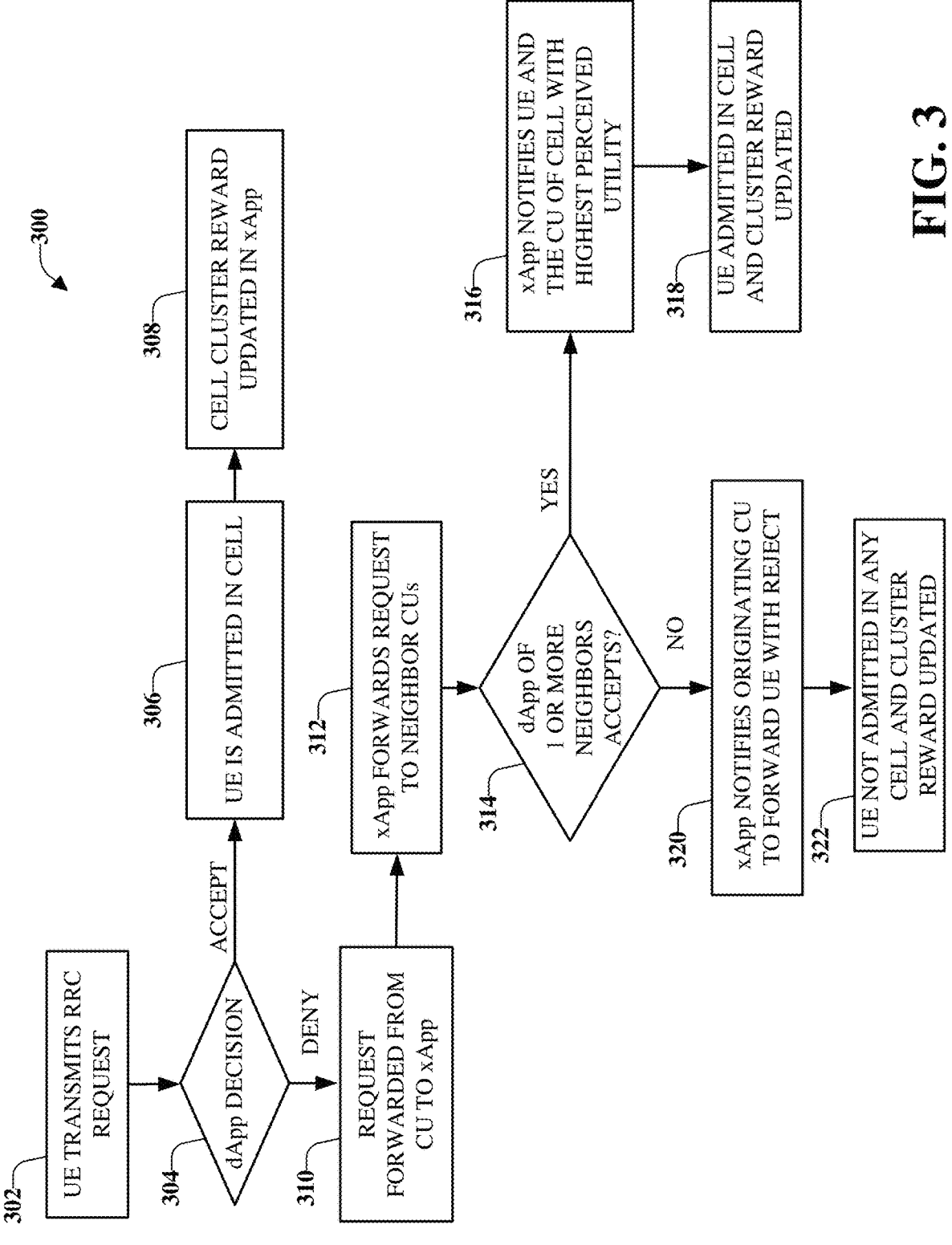
FIG. 3 illustrates a flow diagram of an example, non-limiting, computer-implemented method that facilitates signaling and control for multi-cell user admission control in accordance with one or more embodiments described herein.

FIG. 3 illustrates a flow diagram of an example, non-limiting, computer-implemented method 300 that facilitates signaling and control for multi-cell user admission control in accordance with one or more embodiments described herein. The computer-implemented method 300 and/or other methods discussed herein can be implemented by a system comprising a processor and a memory. In an example, the system can be implemented by a network equipment of a disaggregated network architecture. It is noted that the embodiment of FIG. 3 is discussed with respect to being deployed within an O-RAN framework, however, the disclosed embodiments are not limited to an O-RAN framework.

When a UE wishes to connect to a gNB of the cell group, at 302, the UE transmits an RRC request to that gNB. The dApp within the CU determines, at 304, whether to accept or deny the UE's request. For example, at 304, the dApp can infer, based on a learned model, whether it will accept the UE or otherwise deny the UE. As mentioned earlier, the dApp is primarily a reinforcement learning agent which interacts with the environment, makes a decision from its learning and prior knowledge, and receives a positive or negative reward from the environment as feedback for its actions.

In the situation where the dApp accepts the UE, at 306, the UE is admitted in the cell and the reward for the entire cell cluster is updated, at 308. The reward is granted equally to all the cells within the cluster. The reward is provided in order to incentivize the agents towards achieving the common goal of admitting as many UEs as possible within the cluster. Further details related to the reward will be provided below with respect to FIGS. 7A to 8B.

If the determination at 304 is to deny the request, the request is forwarded from the CU to the xApp, at 310. The request moves up to the near-RT RIC where, at 312, the xApp forwards the request to the closest cells with respect to the original RU that received the request from the UE. The dApps within the CUs of the cells provide a policy recommendation based on perceived intent (a combination of the decision reward and perception of decisions of neighboring cells) of all the cells within the group. The purpose for sharing observations of other reinforcement learning (RL) agents is to use that knowledge within an intent based decision-making processes. In intent-based reinforcement learning, the prior decisions of other agents are also given as input features for improved decision making based upon the prediction and the intrinsic value. The intents of other agents are inferred as beliefs, which may be updated using Bayesian methods and maximum likelihood algorithms. This keeps policies of all RL agents aligned with the overarching network performance optimization objective. Each agent, when forwarded the RRC request, selects a cell admission policy after taking into account the combination of beliefs from other agents, and then chooses the policy that maximizes the expected utility. Along with utilizing the information about prior actions of neighbor CUs, the agents also use replay memory within the RL framework to utilize their own prior observations and state space for speedy decision making without the undesirable temporal correlations.

The dApps of neighbor cells forward their decisions to the xApp. At 314, the xApp determines whether or not it has received acceptance of the UE from one or more neighbor cells. If the xApp receives a positive response from one or more cells ("YES"), based on the global model within near-RT RIC, at 316, the xApp requests the corresponding CU to associate the UE to the cell which yields the highest perceived utility on adding the UE. At 318, the UE is admitted in the cell and the global model in the xApp is updated with the actions and rewards, while the CUs also update their local rewards and memories, as applicable.

If it is determined at 314 that no cell accepts the UE ("NO"), at 320, the xApp notifies the originating CU to forward, to the UE, information related to the rejection. At 322, the UE is not accepted within the cell group and the whole cell group receives a penalty (lower reward) for not accepting the UE within the network. For saturated or nearly saturated clusters, the agents will be encouraged to not admit the UE in order to receive a lesser penalty instead of a high penalty for QoS degradation.

For example, a defined admission saturation level can be determined for the cell cluster and/or for each cell in the cell cluster. If the defined admission saturation level is satisfied, a lower penalty value is applied as compared to a situation where the defined admission saturation level is not satisfied, but UEs are not being admitted to the cell cluster.

As it relates to the determination of what Artificial Intelligence (AI) model and/or Machine Learning (ML) models to deploy for different use cases, the decision depends on multiple factors. Such factors include, but are not limited to, availability of labelled training data, online training capabilities (e.g., through Central Processing Unit (CPU) and/or Graphical Processing Unit (GPU) deployment) at different nodes, latency constraints for different use cases, and model performance in terms of accuracy and stability. In this case, since the policies are non-real time in nature, reinforcement learning based models can be deployed. An advantage of the deployment of reinforcement learning based models is that these models do not need extensive offline training data as the models are trained with interaction from the environment.

The location of the ML models within the disaggregated architecture can be dictated by the turnaround time needed after enforcing the recommended policy. As discussed herein, a mixture of rApps, xApps, and dApps for different scenarios within the use cases can be utilized. The advantages of distributed applications (or dApps) include reduced latency and overhead, AI at the edge, control of MAC and PHY layer functions, and accessing CU and/or DU functions in real-time scale. The dApps bring intelligence at CUs and/or DUs and support real-time inference at tighter timescales than those of the RICs. The disclosed embodiments are discussed with respect to keeping inference level for user admission control at the RRC layer in the CU, which is controlled through policy recommendations by a dApp within the CU. However, the various embodiments are not limited to this scenario and other implementations can be utilized.

Another concern with RL based learning models is that if trained from scratch in a new optimization scenario, it may take a while to attain convergence, and may be suboptimal. Accordingly, the disclosed embodiments utilize transfer learning (TL) by retaining a repository of trained models within the Service Management and Orchestration (SMO) and utilize a model for large scale features of a new learning environment based on a similarity index. The transfer learning-based approach reduces the dependence on labeled data, improves the learning speed, and enhances the ML methods' robustness to different wireless environments. To further improve the learning performance, federated learning (FL) is also employed to improve the performance of local models at near-RT RIC or CU level from the global parameters received from the SMO.

As discussed herein, the various embodiments are based on a new AI framework with deep reinforcement learning models deployed at different layers within a disaggregated architecture with CUs and DUs, such as the O-RAN reference architecture, and using federated learning and transfer learning techniques to improve AI models' performance and convergence. The RL model receives data from E2 nodes, provides user admission control suggestions when a new RRC request is received, and updates its actions based on the reward received from the environment. While RL can help ensure that the model does not need large datasets upfront for training, federated and transfer learning methods enable faster convergence and better performance which is useful in dynamically changing network environments. TL and FL are applied sequentially, and for different objectives. While TL is applied first and focused on model initiation, FL is used to update local model weights and parameters in non-real-time scale to yield better performance. The update to the local model weights and parameters can be performed continuously, continually, periodically, a-periodically, or at another interval.

According to an additional or alterative implementation, a data-driven approach at the cluster level to improve performance is provided. Performance optimization can be performed for a cluster of cells in the network. Since the performance objectives of the cells are intertwined, optimization at the cell level can be more complex as the variables which impact the performance are compounded. Due to joint optimization within a cluster, a mechanism is defined herein whereby a cell admission request may be forwarded to nearby cells. The optimization function per cell cluster is a combination of number of users served, power consumption, and QoS satisfaction rate for each device class of UEs. The different cells should cooperate to maximize the cumulative reward of the cluster.

In this regard for the avoidance of doubt, any embodiments described herein in the context of optimizing performance are not so limited and should be considered also to cover any techniques that implement underlying aspects or parts of the described aspects to improve or increase performance, even if resulting in a sub-optimal variant obtained by relaxing aspects or parts of a given implementation or embodiment.

In an alternative or additional implementation, provided is a new architecture of rApp, xApp, and dApp for fast decisions and cooperation between cells within a cluster. This allows for deployment at the CU level for real-time inference at an Energy Saving Group (ESG) level while reducing the data exchange with the near-RT-RIC and a non-real-time RIC (non-RT-RIC). The role of RICs is explained in the scenario of RRC request transfer between cells so that the overall QoS of the ESG is maintained while admitting a maximum quantity of UEs.

Figure 4:
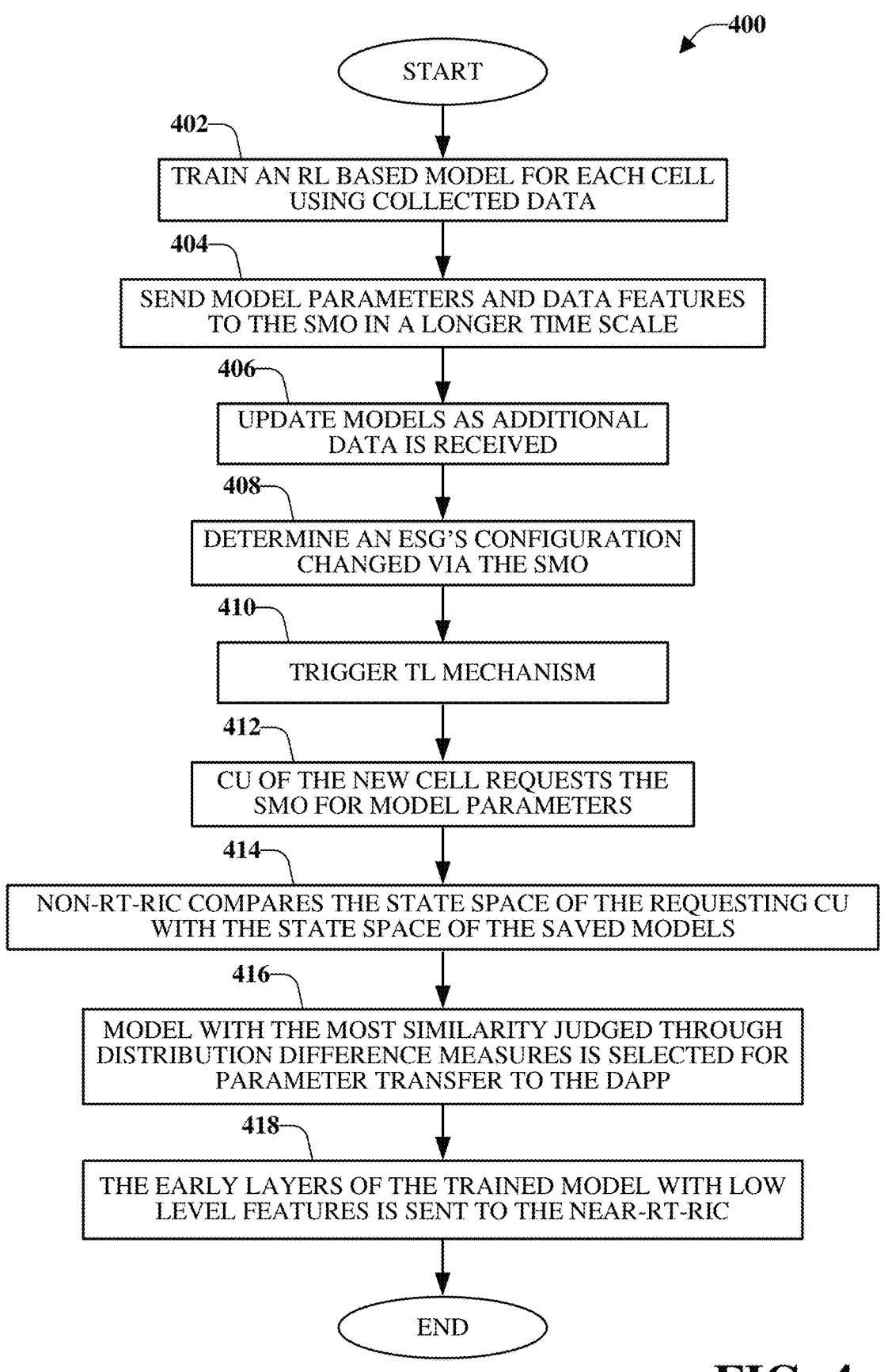
FIG. 4 illustrates a flow diagram of an example, non-limiting, computer-implemented method that facilitates a learning paradigm in accordance with one or more embodiments described herein.

By way of example and not limitation, various embodiments related to the control signaling flow between different O-RAN entities and a possible RL based learning framework for this energy saving use case will be provided. FIG. 4 illustrates a flow diagram of an example, non-limiting, computer-implemented method 400 that facilitates a learning paradigm in accordance with one or more embodiments described herein. The computer-implemented method 400 and/or other methods discussed herein can be implemented by a system comprising a processor and a memory. In an example, the system can be implemented by a network equipment of a disaggregated network architecture.

For the case of multi cell user admission control and traffic steering, real-time inference is performed via distributed applications (dApps) in a CU. At 402, the dApp trains an RL based model for each cell using data collected from a RU. The collected data can include the network load of both the current cell and its neighbors, user signal quality measures (e.g., Reference Signal Received Power (RSRP), SINR), and so on. At 404, the dApp sends its model parameters along with the data features to the SMO in a longer time scale. These models are updated as more data is received, at 406. At 408, a determination is made that an ESG's configuration is changed via the SMO. The changes include, but are not limited to, one or more new cells joining, cluster enhancing, shrinkage to address traffic fluctuations, and so on. At 410, the TL mechanism is triggered.

To facilitate the TL mechanism, at 412, the CU of the new cell requests the SMO for model parameters. At 414, the non-RT-RIC compares the state space of the requesting CU with the state space of the saved models. Multiple indices can be used to ascertain distribution similarity. For example, indicates such as maximum mean discrepancy (MMD), Kull-back-Leibler divergence (KLD), Wasserstein distance (WD), central moment discrepancy, and so on, can be utilized. Further, at 416, the model with the most similarity judged through distribution difference measures is selected for parameter transfer to the dApp. The early layers of the trained model with low level features area sent to the near-RT-RIC, at 418. The transfer learning approach through model parameter transfer enables faster convergence for the dApp model. The similarity index can be a function of multiple factors including, but not limited to, UE distribution, cell loads, propagation terrains, and so on. Since the source and target domain are identical, this is an example of a homogeneous TL scenario.

A federated learning approach can be used for in-field update of the models. The federated learning approach includes the CU hosted RL agents uploading the weights of their local RL model to a centralized coordinator within a cloud computing environment (e.g., an O-Cloud), which is accessible to the rApp within the non-RT-RIC. The model upload can be performed automatically, such as after multiple episodes of training in each round, for example. At the SMO database, these local models, which may be a subset of total ESGs, are aggregated at the centralized model. The aggregated model is transmitted back to the CUs so that the dApp models are updated over a longer time horizon (e.g., 5 seconds, 10 seconds, 12 seconds, or another time horizon).

There are different methods of aggregation. One method of aggregation includes selecting models on the basis of accumulated rewards. For example, ESG models that yield higher performance gain can be selected to update the global model. Another method of aggregation includes aggregation of all models without any preference.

To avoid bias from individual ESG agents within the federated learning architecture, only a part of RL model parameters of each RL agent within the dApps are used for aggregation in consensus. A way of implementing this is by using a dueling deep Q network (DQN) structure, based on which the selected RL agents only present their common-network and value-function parameters to the global model server for aggregation. After aggregation, each RL model combines the newly obtained parameters and the locally trained advantage-function parameters as the new parameters of the new local DQN.

Figure 5:
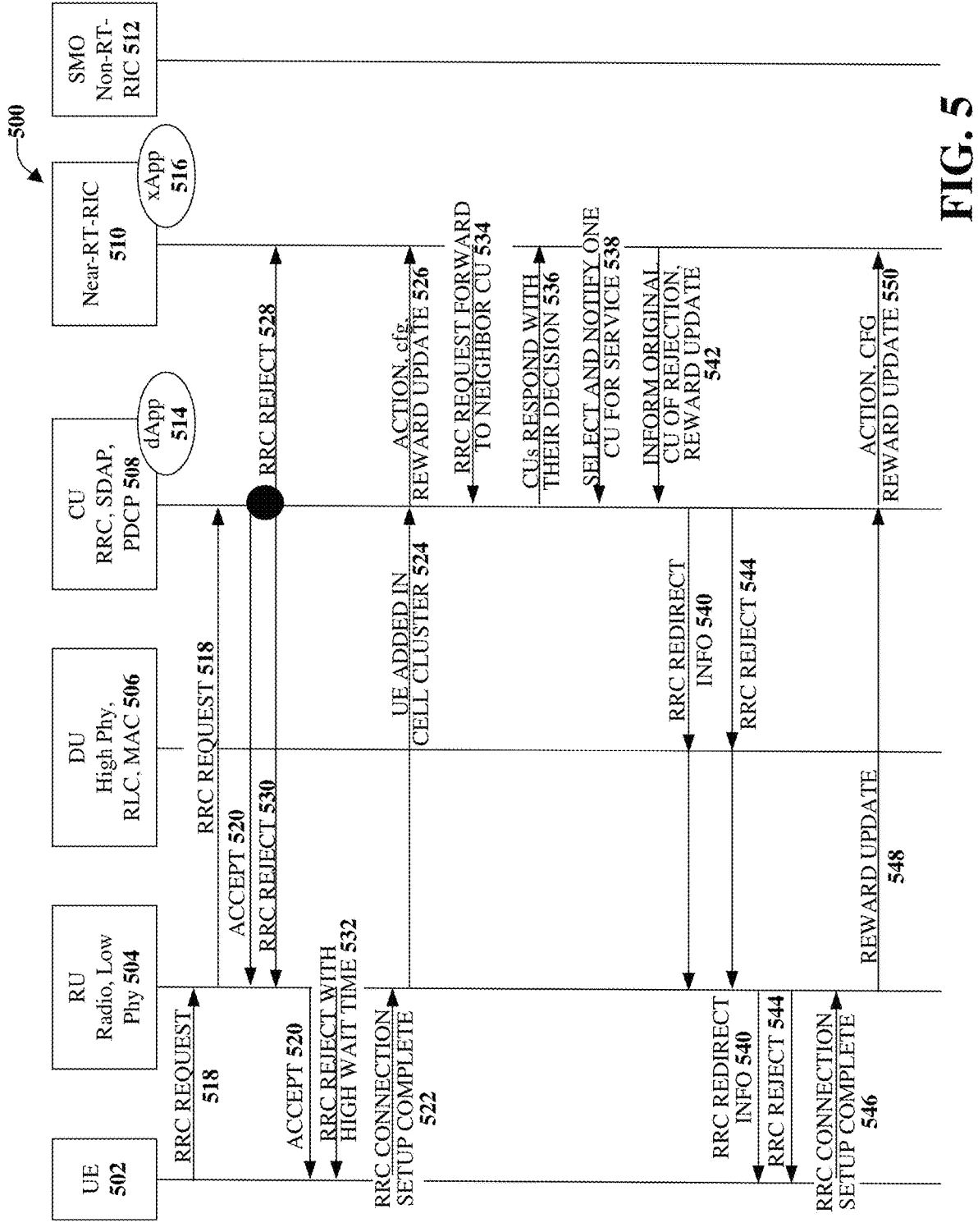
FIG. 5 illustrates an example, non-limiting, message sequence flow chart that facilitates multi-cell user equipment admission control in accordance with one or more embodiments described herein.

FIG. 5 illustrates an example, non-limiting, message sequence flow chart 500 that facilitates multi-cell user equipment admission control in accordance with one or more embodiments described herein. As illustrated, the message sequence flow chart 500 represents the message sequence between at least one user equipment (UE 502), a RU layer 504, a DU layer 506, a CU layer 508, a Near-RT-RIC 510, and an SMO 512. In this message sequence flow chart 500, the CUs and the Near-RT-RIC are non-co-located (e.g., are separate units).

As illustrated a dApp 514 is associated with the CU layer 508 (e.g., respective dApps are associated with respective CUs of respective cells of a multitude of cells). Each dApp is considered an agent, and, therefore, multi-agent reinforcement learning can be utilized in the non-co-located arrangement.

An xApp 516 is associated with the Near-RT-RIC 510. The xApp 516 has knowledge (e.g., visibility) of the multitude of cells. Further, the xApp 516 can control the respective cells of the multitude of cells via the respective dApps. Accordingly, the message sequence flow chart 500 represents a many to one relationship between the CUS (e.g., the CU layer 508) and the Near-RT-RIC 510. Thus, the Near-RT-RIC 510 can be placed at a location (e.g., virtual or physical) where it can control one or more CUs. Thus, since the CUs and the Near-RT-RIC are non-co-located, they can be at different locations, the same location, or combinations thereof (e.g., a first CU is located at about the same location as the Near-RT-RIC and at least a second CU is located at a different location than the Near-RT-RIC).

As discussed above, for example purposes a 1-1-1 link between the RU, the DU, and the CU and coordination occurring at the near-RT-RIC within a cloud computing environment (e.g., O-Cloud) will be assumed. For coordination between RRCs, the near-RT RIC is assumed to have the details needed, other than the RSRP, to identify the best gNB that a UE can connect to, based on a cumulative criteria including RSRP, user location, mobility patterns, and also the cell load profiles.

At 518 a request is transmitted from the UE 502 to the RU layer 504 and forwarded to the CU of the cell. The request can be an RRC request. If the request is accepted by the cell, an acceptance request is returned to the UE at 520 and acceptance of the UE 502 is performed. As indicated at 522, an RRC connection setup completion notice is conveyed by the UE 502. Upon or after the completion of the connection setup, the UE is added in the cell cluster, at 524. Further, the action, configuration, and reward update occur at 526. The reward update is utilized as feedback to one or more models.

Alternatively, if the request transmitted, at 518, is not accepted by the cell, the decision to reject is transmitted one layer up, at 528, from the dApp 514 to the xApp 516 in order for the xApp 516 to perform its own processing of the request by determining if one or more other cells in a cell cluster can accept the UE. Further, information related to the rejection is also transmitted, at 530, to the RU 504. In addition, information related to the rejection is also conveyed to the UE 502, at 532, with an indication that there will be a wait time before a determination is made related to whether the UE 502 can be admitted into the cell cluster. It is noted that the wait time can be considered a "high" wait time, meaning that it takes a little longer to allow access for the UE.

To process the request, the xApp 516 forwards the request from the UE 502 to neighbor CUs, at 534. Each of the neighbor CUs individually determines whether or not it can accept the UE 502 and responds with their respective decisions, at 536. If none of the neighboring CUs accept the UE 502, a negative reward is applied to the entire cell cluster that comprise the multiple cells (e.g., the neighbor cells or neighbor CUs). The negative reward update is utilized as feedback to one or more models.

However, if one or more neighbor CUs accepts the request, the cell with the highest perceived utility is selected, at 538. Information is also provided to the selected cell so that it can accept the UE. The UE is provided the redirect information for the selected cell, at 540. The redirect information, in this situation, informs the UE that instead of connecting to a first cell (e.g., the original cell to which the RRC request was sent at 518 (e.g., requested cell)), the UE should connect to the cell selected at 538.

Further, at 542, the original cell, to which the request was initially sent (at 518) is notified of the reward update related to the rejection at 540. RRC Rejection information from the original cell is transmitted to the UE, at indicated at 544.

Upon or after the information is exchanged and the process of establishing the RRC connection to the selected cell is complete, at 546, the reward is updated, at 548. Further, at 550, the action, configuration (cfg), and the reward update occur. The configuration is the actions that need to be taken within the disaggregated architecture. The action and reward are related to the reinforcement learning process and is fed back to the one or more models.

In the implementation of the message sequence flow chart 500 illustrated in FIG. 5, latency constraints for the UE request may be jeopardized due to the time needed for the coordination between near-RT RIC and CUs (e.g., to find another cell that is able to admit the UE). Since RRC processing is time consuming when compared to the sub-frame scale, the turnaround times of the multi-agent RL approach may not be able to satisfy the timeline for an RRC request by a UE. To address this, another implementation of a use case is when the CU and the near-RT RIC are considered to be co-located; and an CU is coordinating traffic and signaling flow from multiple DUs. Such an embodiment is depicted in FIG. 6, which illustrates another example, non-limiting, message sequence flow chart 600 that facilitates multi-cell user equipment admission control in accordance with one or more embodiments described herein.

Figure 6:
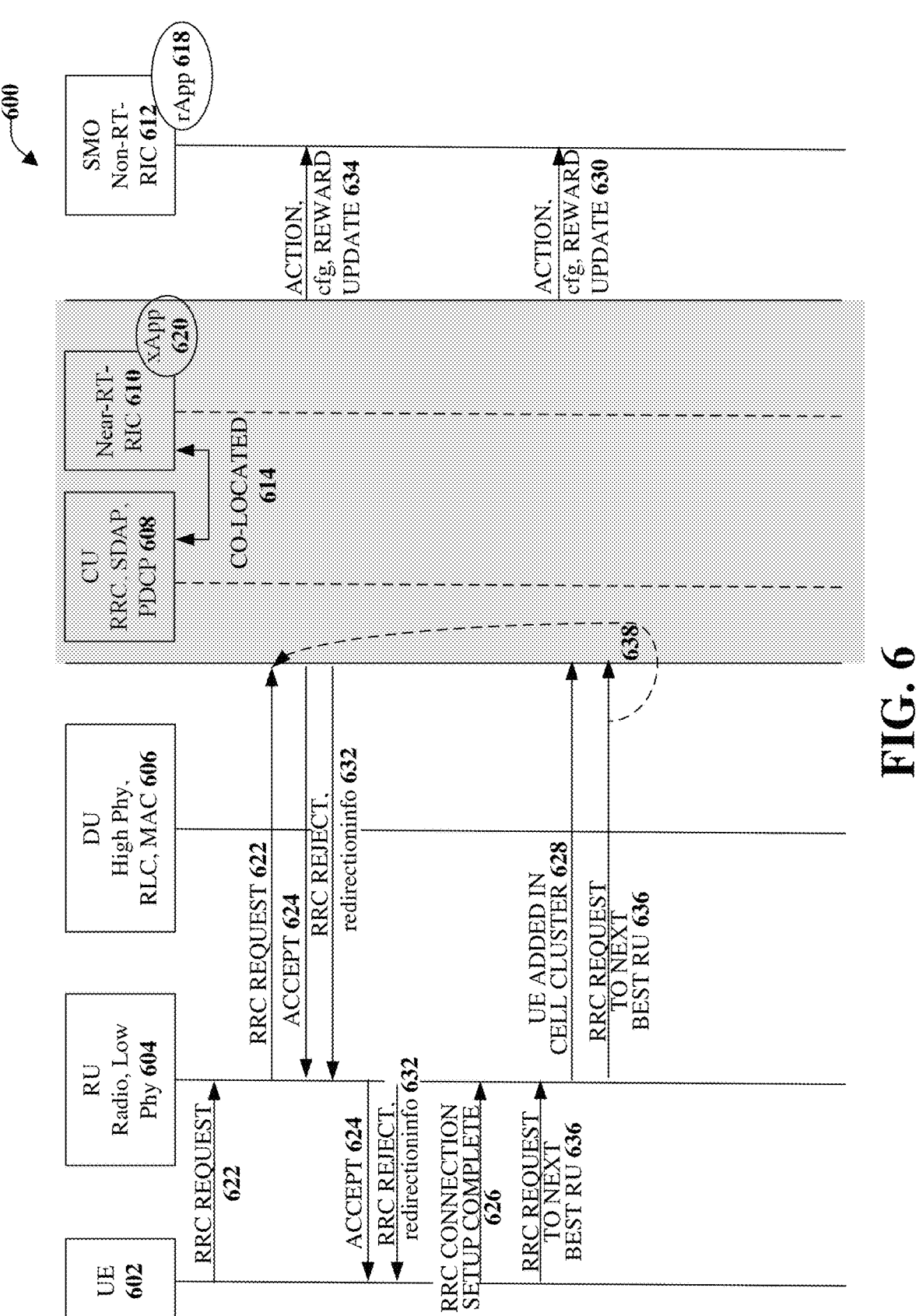
FIG. 6 illustrates another example, non-limiting, message sequence flow chart that facilitates multi-cell user equipment admission control in accordance with one or more embodiments described herein.

As illustrated in FIG. 6, the message sequence flow chart 600 represents the message sequence between at least one user equipment (e.g., the UE 602), a RU layer 604, a DU layer 606, a CU layer 608, a Near-RT-RIC 610, and an SMO 612. The SMO 612 is a non-real-time RIC (Non-RT-RIC) that is associated with an rApp 618.

In this message sequence flow chart 600, the CU layer 608 and the Near-RT-RIC 610 are co-located entities 614. Thus, in the embodiment of FIG. 6, an xApp 620 associated with the near-RT-RIC 610 provides centralized coordination for the cell cluster in the form of a single agent. As compared to the message sequence flow chart 500 of FIG. 5, which includes a dApp 514 (associated with the CU layer 508), a dApp is not included in the message sequence flow chart 600 of FIG. 6 due to the CU layer 608 and the Near-RT-RIC 610 being co-located entities 614. The xApp is considered an agent, and, therefore, a single agent model can be utilized in the co-located arrangement.

The UE (or multiple UEs) can send requests (e.g., an RRC request) for admission to a cell, as indicated at 622. The single agent (e.g., the xApp 620) can process the requests and can accept or reject the request for a particular RU. If the request is accepted, at 624, an acceptance request is returned to the UE 602 and acceptance of the UE 602 is performed. As indicated at 626, an RRC connection setup completion notice is conveyed by the UE 602. Upon or after the completion of the connection setup, the UE is added in the cell cluster, at 628. Further, the action, configuration, and reward update occur, at 630. The reward update is utilized as feedback to one or more models.

Alternatively, upon or after the RRC request 622 is received, it can be decided by the xApp 620 that the request for a particular cell should be rejected. Therefore, RRC rejection redirection information is conveyed to the UE 602, at 632. The RRC rejection redirection information can provide redirection guidance in case of a rejection.

Further, an action, configuration, and reward update occur at 634. The reward update is utilized as fed back to one or more models. At 636, the UE 602 sends an RRC to one or more new cells and/or the same cells upon or after receiving the RRC reject message. In an example, a new cell can be the next best cell. The CU notifies the RU to be ready for RRC connection request when a redirection decision is made by the CU. As indicated by dotted arrow 638, the process cycle continues until an RU accepts the UE into the cell.

For the embodiment of FIG. 6, the xApp 620 is processing the requests (e.g., the RRC request (622 and/or 636) in order to reject or accept the request. Thus, when a request is received, the xApp 620 automatically decides which cell should take the new UE (e.g., the UE 602). Since there is no dApp in this embodiment, the xApp is making the decision at the near-RT-RIC 610 and it is forwarding the redirection information back to the UE 602. Any policies that the xApp makes may or might not be accepted by RRC layer of the new cell. Thus, any policies the xApps makes are not final per se because those are just policy recommendations and the RRC layer, based on its own functions and its own rules, can selectively accept those recommendations. If it does not agree, the rejection decision is also forwarded back to the xApp for retraining so that the xApp knows a particular action is not acceptable to the RRC. Overall, in this embodiment it is being ensured that a single xApp has visibility of multiple cells, the single xApp can select a cell, and can provide the information related to the selected cell back to the UE for redirect.

As mentioned, an rApp 618 is associated with the SMO 612 (or Non-RT-RIC layer) within the O-RAN. The rApp 618 is useful for transfer learning and/or federated learning, which can be facilitated through the SMO 612. For example, in the transfer learning process, if a new energy saving group (ESG) is constructed through different cells (particularly for reinforcement learning solutions) seed data should be utilized to begin training that new model. According to some implementations, the SMO 612 can have a data structure or list of trained models based on one or more model transfers occurring from the xApp 620 to the SMO 612. The SMO 612 can facilitate model initiation based on one or more similarity indexes and/or based on one or more similarity parameters. In some implementations, the initial model parameters can be forwarded from the SMO 612 to the near-RT-RIC 610 to the xApp 620 when a new ESG is created or when a new model (corresponding to an ESG) is needed in an xApp. In such a manner, model training can be faster, can be improved in terms of performance, and can obtain results faster, for example. This process can be facilitated via transfer learning.

Alternatively, or additionally, predictive learning helps by improving model performance for a local model by taking into consideration values of all the local models, averaging those values in a central entity (e.g., the SMO 612), and forwarding those average values back to the local models. Such a process can improve the performance of the local models because of the ability to obtain visibility and/or insight of parameters from data that is more diverse and more spread out rather than just training on localized data for a localized model.

These processes (transfer learning and predictive learning) can occur simultaneously, or at substantially the same time, and/or at different times. All the model updates, and whenever a decision takes place, the decision is performed at the SMO 612, and the global model is updated. The process of global model parameters being forwarded to the xApp is occurring simultaneously or at substantially a same time, at a different time, and/or after a particular time interval, which is configurable based on how frequently those models should be updated, what kind of parameters should be used, and/or if there are any priority of any parameters that should be used. This can be based on how those particular kinds of learning (transfer/predictive) are desired to be designed. It is noted that transfer learning is only for the initial part, while predictive learning is occurring after a particular interval of time.

In the embodiment with a co-located CU and Near-RT RIC (FIG. 6), the learning and action space can be centralized and in terms of RL, the RL can be considered to be a single agent RL based learning. Since a CU will be managing requests from multiple DUs and RUS, centralized coordination can be possible. While the single xApp aims to optimize its reward by efficient user admission and collaboration among cells, an rApp within the non-RT-RIC is used for federation and convergence for learning in non-real time scale.

According to an additional or alternative embodiment, provided is a Reinforcement Learning (RL) based training model in a non-co-located CU and near RT RIC scenario (e.g., FIG. 5). The underlying RL based training model can have various elements in the learning cycle, which can include an agent (per cell), state space (per cell), and action space. The agent (per cell) can be, for example, a dApp controlled via the actuators (e.g., the CU, the DU, and so on).

A state space (per cell) for the RL learning mode is information that can be included in the model training. The state space (per cell) for the RL learning model can contain various features or parameters from the cell cluster. Examples of such features include, but are not limited to, cell load, RSRP-xth percentile, SINR-xth percentile, and Delay-xth percentile. The delay is the time it takes for a UE to obtain the service or to be scheduled.

As it relates to the "xth percentile," in some cases, the mean of one or more of the above noted features can be determined and that mean value can be stored (in a storage device) as the value. For example, the mean of the RSRP for all UEs can be determined and stored as the RSRP value per cell. In another example, the mean of the SINR for all values for all UEs can be determined and stored as the SINR value per cell. However, according to the various embodiments, an xth percentile is utilized. This xth percentile is configurable based on the percentage of UEs that should contribute to the value. For example, it might be determined that values from 55% of all UEs should be taken, or values from 70% of all UEs should be taken, and so on. Thus, the xth percentile can be changed in order to train the model. Accordingly, the value can fluctuate based on how many UEs should be taken into consideration for the values, instead of merely taking the mean value.

Another example of a feature that can be obtained from the cell cluster for the RL learning model can include, but is not limited to, Maximum (RRC rejections) for UEs pending service. RRC rejection is the process where a cell indicates to a UE that the cell cannot admit the UE (e.g., an RRC rejection). This information is valuable because it provides an indication of a remaining amount of time before the UE is admitted to the cell.

In an example, the maximum RRC rejection per UE is 1 and there are 10 UEs that are requesting service from a cell. In this example, each of those UEs is given a rejection, thus, there are 10 rejections for the 10 UEs. Therefore, the RRC rejection level is at the maximum rejection level (each UE rejected only once). Considering the simple scenario where the UEs are homogeneous (not diverse), there will be some QOS degradation because at least one UE is waiting and has been rejected once. However, in another example, the maximum RRC rejection per UE is 10. In this example, if 1 UE is requesting service and has been rejected on 10 consecutive RRC requests, the total number of RRC rejections is 10. That means there are UEs which have been rejected for many consecutive RRC requests, which is bad especially for UEs that are not receiving any service at all and have not been admitted to the network. Thus, the maximum RRC rejection parameter is important especially as it relates to QoS. Therefore, information related to the maximum RRC rejection per UE (or similar parameter) should be included in the model in order to determine how the RRC rejections are distributed among the UEs.

Other examples of features that can be obtained from the cell cluster for the RL learning model can include, but are not limited to, N1 Cell Load, N1 RSRP-xth percentile, N1 SINR-xth percentile, N1 Delay-xth percentile, N2 Cell Load, N2 RSRP-xth percentile, N2 SINR-xth percentile, and N2 Delay-xth percentile. The term "N1" references the closest neighboring cell and the term "N2" references the second closest neighboring cell. It is noted that more than two neighboring cells can be utilized with the disclosed embodiments, and only two are described for purposes of simplicity.

By using the closest neighbor (N1), the second closest neighbor (N2), and so on (e.g., N3, N4, N5, . . . ) the incoming RRC request can be forwarded or redirected to another cell (if the original cell denied the request). For example, if the original cell is heavily loaded with network traffic, the incoming UE can be redirected to another cell that is not as heavily loaded, provided the other cell is close by (e.g., within a defined geographic area). Accordingly, the parameters related to the N1, N2, and so on, cells can be useful for training the model and using the model during execution of network admission. By having the information about the neighbor cells, it can be determined whether (or not) it is a good decision to transfer the RRC request to those neighbors or whether the UE should be rejected, depending on what the ideal response would be in that situation.

According to some example embodiments, the cell load, RSRP, SINR, and delay values for the two (or more) closest neighbor cells (N1—closest and N2—2nd closest) can be forwarded by the near-RT RIC in a longer time scale. Although the neighbor statistics might not be updated in real-time, these past values can still help with the learning as the agent can make decisions based on the load and KPI comparison between itself and the neighbor cells. Further, as discussed above, instead of using the commonly used mean statistics, the xth percentile values can be utilized, where x determines how much satisfaction is the goal as it relates to performance. For example, a 5th or a 10th percentile statistic would mean that the system is ensuring that at least 95% or 90% users experience satisfied performance in terms of QoS.

The Action Space is what actions the model takes. As it relates to the action space, the action for every agent would be binary, (e.g., accept/reject) when an RRC request comes either through the RU or via the near-RT RIC in case the original CU rejects an incoming user admission request.

FIG. 7A illustrates a second equation (2) for a long-term reward function in accordance with one or more embodiments described herein. Further, FIG. 7B illustrates a third equation (3) for assigning a priority coefficient to each performance indicator in accordance with one or more embodiments described herein.

The reward function for the agents reflects the objective function utility supplemented with a reward shaping function for faster convergence of the algorithm. As discussed herein, the reward function utilizes the history repository within the central SMO to improve actions based on other agents' intents. In intent based multi-agent reinforcement learning, the prior decisions of other agents are also given as input feature for improved decision making based upon the prediction and the intrinsic value. To facilitate faster convergence, an exponential function-based reward shaping is applied which yields higher rewards for actions that provide close to the optimal utility values. This amplifies the difference between values of the utility function. In a Deep Reinforcement Learning (DRL) based approach, the discerning of difference between agents' actions allows acceleration of the stochastic gradient descent (SGD) algorithm in the Deep Neural Network (DNN). The long-term reward function is given by the second equation (2) in FIG. 7A.

As given in the third equation (3) in FIG. 7B, a priority coefficient is given to each performance indicator (e.g., each KPI). Examples of these performance indicators include, but are not limited to: user equipment admission rate, QoS satisfaction rate, and/or cluster power consumption. These coefficients are configurable based on, for example, energy policies, which can be utilized to vary the operating point between various objectives.

For example, if $\alpha \gg \beta, \gamma$, a higher priority can be given to the user admission rate which means that the network will prefer to accept most cell admission requests. However, when there is too much QoS degradation, at that point, it will be feasible for the cluster to reject the admission request in favor of better-quality service to the existing UEs. An invalid action in this use case may be the case when the agent suggests a cell that is fully loaded or does not provide coverage to the UE in its current location. The user admission rate is the percentage of UEs accepted (or admitted) after receiving RRC requests in the network, while the power consumption factor is the ratio of power consumed by the network during a time instance and the max power consumption at highest load and without any power saving measure. The QoE satisfaction rate is the percentage of UEs within the network with their KPI thresholds satisfied. These thresholds depend on the device categories. For example, an eMBB device may have SINR or throughput as its QoE satisfaction KPI, while a URLLC device may have service latency as its KPI. While the disclosed embodiments attempt to minimize power consumption and maximize UE admission in the network simultaneously or at substantially the same time, the overall QoE satisfaction rate, if degraded, will penalize the agents by reducing their reward, hence policies with the right tradeoff between the two (minimize power consumption, maximize UE admission) will be selected per ESG.

Another consideration while defining the reward function is that a UE which is continuously being rejected for service will become associated with a higher penalty on the cell group. Considering that all UE requests qualify the minimum RSRP criterion for service, although such a situation is highly unlikely, the utility within the reward function can be modified. FIG. 8A illustrates a fourth equation (4) for modifying the utility within the reward function in accordance with one or more embodiments described herein. In FIG. 8A, RS(t) is the rejection score of a cell which is a function of both the number of UEs rejected over the last T slots, along with the reoccurrence of the rejection for those UEs.

FIG. 8B illustrates a fifth equation (5) for mathematically expressing the rejection score in accordance with one or more embodiments described herein. According to FIG. 8B, N(t) is the number of UEs requested service over last T slots and rn (t) is the number of RRC rejections for UE 'n' over last T slots. The number of RRC rejections for a single UE will result in exponential reduction in RL utility; so, such a situation will tend to be avoidable through efficient learning.

As discussed herein, provided are systems, methods, and other embodiments for multi-cell admission control within an O-RAN framework. A goal of the various embodiments is to maximize the number of UEs admitted within a cluster of cells with defined quality of service constraints while improving energy efficiency. Several embodiments have been provided to outline the ways in which the embodiments can be employed in the network design. Provided are AI and/or ML techniques that will be deployed and mapped to different network entities of the O-RAN framework within which they will be hosted along with the flow of data and requisite signaling for algorithmic learning, and policy executions. The disclosed embodiments provide a unique approach for simultaneous AI and/or ML applications (dApp, xApp, and rApp) deployment at O-RAN Control Unit (O-CU), near real-time RIC radio intelligent controller (near-RT RIC) and non-real-time radio intelligent controller (non-RT RIC) respectively, to enable fast decisions and cooperation between cells within a cell cluster. A data driven reinforcement learning approach for online learning and real-time policy execution can be employed. To improve the model performance, a combination of federated learning, transfer learning, and intent based reinforcement learning approaches can be utilized to yield better results and faster convergence.

Example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 second) control of RAN elements and their resources through applications, e.g., specialized applications called rApps. Example, non-limiting Near-Real Time RAN Intelligent Controller (Near-RT RIC) functions enable near-real-time optimization and control and data monitoring of O-CU and O-DU nodes in near-RT timescales (e.g., a second range of time representing less time than the first time range, such as between 10 milliseconds and 1 second). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RAN Intelligent Controller (RT RIC) is designed to handle network functions at real time timescales (e.g., a third range of time representing less time than the first time range and the second time range, such as <10 milliseconds).

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. More-over, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity." "client." "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 9:
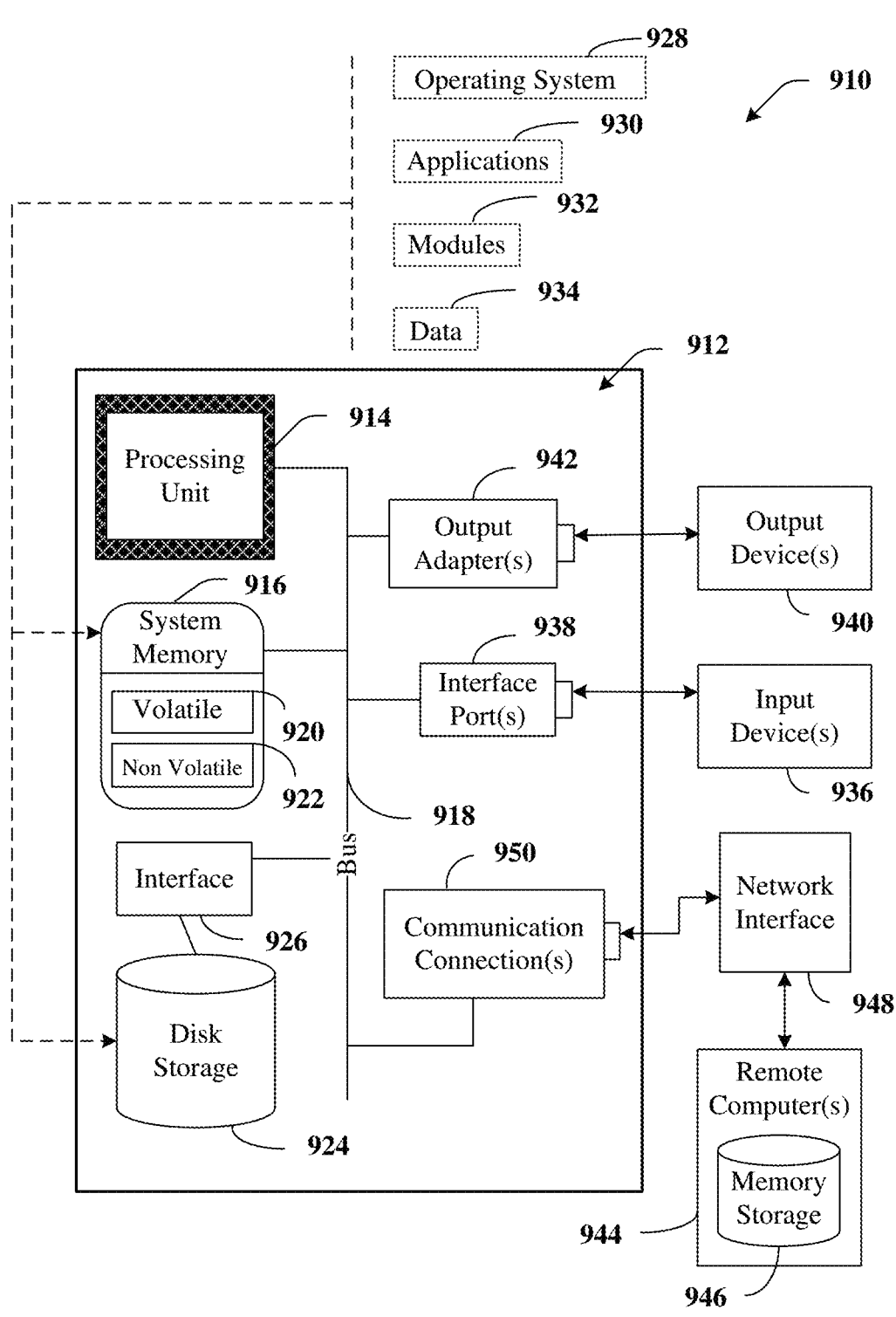
FIG. 9 illustrates an example, non-limiting, computing environment in which one or more embodiments described herein can be facilitated.

In order to provide a context for the various aspects of the disclosed subject matter, FIG. 9 as well as the following discussion are intended to provide a brief, general description of a suitable environment in which the various aspects of the disclosed subject matter can be implemented.

With reference to FIG. 9, an example environment 910 for implementing various aspects of the aforementioned subject matter comprises a computer 912. The computer 912 comprises a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 comprises volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can comprise read only memory (ROM), programmable ROM (PROM), electrically programmable ROM (EPROM), electrically erasable PROM (EEPROM), or flash memory. Volatile memory 920 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also comprises removable/non-removable, volatile/non-volatile computer storage media. FIG. 9 illustrates, for example a disk storage 924. Disk storage 924 comprises, but is not limited to, devices like a magnetic disk drive, floppy disk drive, tape drive, Jaz drive, Zip drive, LS-100 drive, flash memory card, or memory stick. In addition, disk storage 924 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software comprises an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 comprise, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 comprise, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically comprises many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 comprises, for exemplary purposes only, internal and external technologies such as, modems including regular telephone grade modems, cable modems and DSL modems, ISDN adapters, and Ethernet cards.

Figure 10:
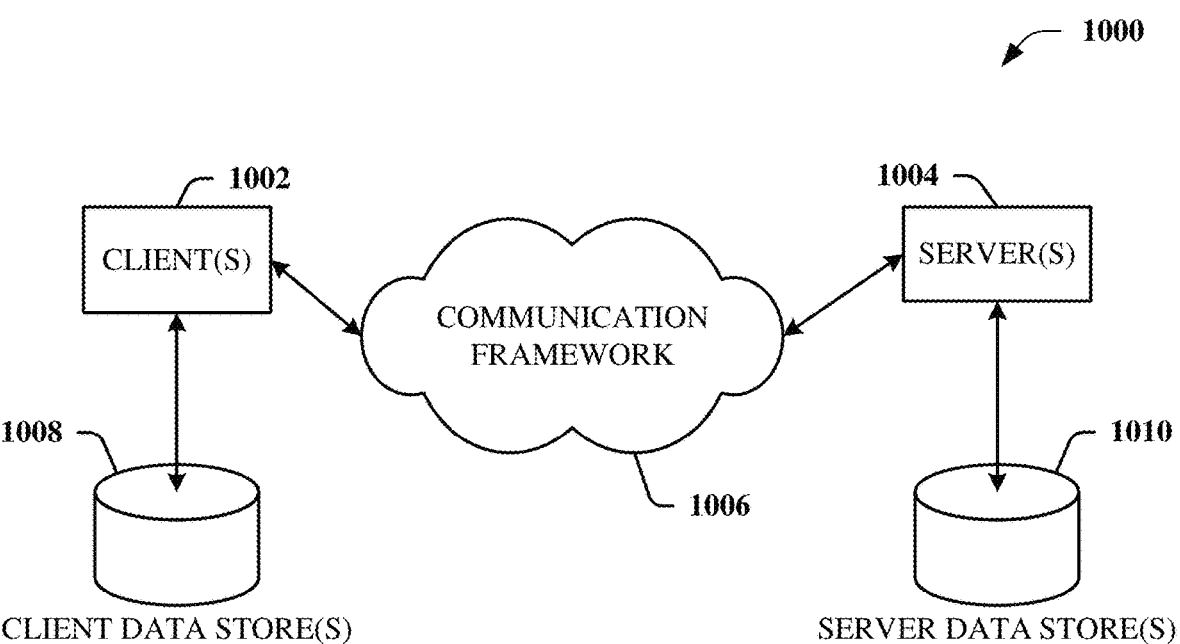
FIG. 10 illustrates an example, non-limiting, networking environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
based on notification of a denial of an admission request by a first central unit of a first cell of a cell cluster, facilitating, by a system comprising a near-real-time-radio access network intelligent controller (near-RT-RIC) that comprises at least one processor, a transmission of the admission request to a second central unit of a second cell of the cell cluster and at least a third central unit of at least a third cell of the cell cluster, wherein the second cell and at least the third cell are neighbor cells of the first cell, wherein the admission request is received at the first central unit from a user equipment via a radio unit, and wherein a distributed application deployed by the first central unit denies the admission request; and
based on receipt of an acceptance of the admission request from the second cell and the third cell, and based on a determination that a first utility of the second cell is higher than a second utility of at least the third cell, selecting, by the system, the second cell as an admission cell for the user equipment; and
facilitating, by the system, admission of the user equipment to the cell cluster via the second cell.

2. The method of claim 1, further comprising:
based on the receipt of the acceptance and after the admission of the user equipment to the cell cluster, evaluating, by the system, an optimization function that is a combination of a number of user equipment served, comprising the user equipment, a power consumption, and a quality of service satisfaction rate; and
based on the evaluating, applying, by the system, a reward value to information used as input to respective models associated with the first cell, the second cell, and the third cell.

3. The method of claim 2, wherein the applying comprises:
based on at least the quality of service satisfaction rate being determined to satisfy a defined threshold, assigning, by the system, a first value as the reward value; and
based on at least the quality of service satisfaction rate being determined to fail to satisfy the defined threshold, assigning, by the system, a second value as the reward value, wherein the second value is less than the first value.

4. The method of claim 2, wherein the respective models are reinforcement learning based models.

5. The method of claim 1, wherein the denial of the admission request is a first denial of the admission request, and wherein the method further comprises:

based on a second denial of the admission request received from the second cell and a third denial of the admission request received from the third cell, applying, by the system, a penalty to information used as input to respective models associated with the first cell, the second cell, and the third cell.

6. The method of claim 1, further comprising:

prior to the selecting and based on the user equipment being admitted to the second cell, determining, by the system, the first utility of the second cell based on an expected first power consumption of the second cell and a first predicted quality of service for the user equipment; and based on the user equipment being admitted to the third cell, determining, by the system, the second utility of the third cell based on an expected second power consumption of the third cell and a second predicted quality of service for the user equipment.

7. The method of claim 1, wherein the system is implemented within a disaggregated architecture that comprises central units, distributed units, and a near-real-time-radio access network intelligent controller.

8. A system, comprising:

a first central unit of a first cell that receives, from a radio unit, a connection request from a user equipment, wherein a distributed application deployed by the first central unit denies the connection request; and a near-real-time-radio access network intelligent controller (near-RT-RIC) comprising at least one memory and at least one processor, wherein the near-RT-RIC receives, from the first central unit, a notification of a denial of the connection request, and forwards the connection request to a second central unit of a second cell and at least a third central unit of at least a third cell, wherein the second cell and at least the third cell are nearest neighbor cells of the first cell, and wherein, based on respective affirmative responses from the second cell and at least the third cell and respective utility functions of the second cell and at least the third cell, the near-RT-RIC selects the second cell for admission of the user equipment at the second cell.

9. The system of claim 8, wherein the near-RT-RIC, based on selection of the second cell, conveys, to the user equipment, a redirect message that identifies the second cell.

10. The system of claim 8, wherein a cell cluster comprises the first cell, the second cell, and at least the third cell, and wherein, based on receipt of the respective affirmative responses and after the admission of the user equipment to the cell cluster, the near-RT-RIC evaluates an optimization function that is a combination of a number of user equipment served, comprising the user equipment, a power consumption, and a quality of service satisfaction rate; and based on the evaluating, the near-RT-RIC applies a reward value to information used as input to respective models associated with the first cell, the second cell, and the third cell.

11. The system of claim 10, wherein, based on at least the quality of service satisfaction rate being determined to satisfy a defined threshold, the near-RT-RIC, assigns a first value as the reward value, and based on at least the quality of service satisfaction rate being determined to fail to satisfy the defined threshold, the near-RT-RIC assigns a second value as the reward value, wherein the second value is less than the first value.

12. The system of claim 8, wherein, based on respective negative responses from the second cell and at least the third cell, the near-RT-RIC provides information indicative of a penalty value to inputs of respective reinforcement learning models of the first central unit, the second central unit, and at least the third central unit.

13. The system of claim 8, wherein the first central unit comprises a first model, the second central unit comprises a second model, and at least the third central unit comprises at least a third model, wherein the first model, the second model, and the third model are trained, to a defined confidence level, to facilitate admission control for maximizing a quantity of user equipment being admitted based on defined energy consumption parameters.

14. The system of claim 13, wherein the first model, the second model, and the third model, are deep reinforcement learning models.

15. The system of claim 8, wherein the system is deployed in a disaggregated architecture.

16. The system of claim 8, wherein the first central unit, the second central unit, at least the third central unit, and the near-RT-RIC are arranged in a non-co-located deployment.

17. The system of claim 8, wherein the first central unit, the second central unit, at least the third central unit, and the near-RT-RIC are arranged in a non-co-located deployment.

18. A non-transitory machine-readable medium, comprising executable instructions that, when executed by at least one processor of a near-real-time-radio access network intelligent controller (near-RT-RIC), facilitate performance of operations, comprising:

based on a request from a user equipment for admission into a cell cluster being denied by a first central unit of a first cell, notifying an admission request to a second central unit of a second cell of the cell cluster and at least a third central unit of at least a third cell of the cell cluster, wherein the second cell and at least the third cell are neighbor cells of the first cell and wherein a distributed application deployed by the first central unit denies the admission;

based on receipt of an acceptance of the admission request from the second cell and the third cell, and based on a determination that a first utility of the second cell is higher than a second utility of at least the third cell, sending, to the user equipment, first information indicative of a redirection to the second cell; and sending, to the second cell, second information indicative of a selection of the second cell for the admission of the user equipment.

19. The non-transitory machine-readable medium of claim 18, wherein the operations further comprise:

evaluating an optimization function that is a combination of a number of user equipment served, comprising the user equipment, a power consumption, and a quality of service satisfaction rate; and based on the evaluating, applying a reward value to information used as input to respective models associated with the first cell, the second cell, and the third cell.

20. The non-transitory machine-readable medium of claim 18, wherein the operations further comprise:

based on the second cell and the third cell not accepting the request, sending, to the user equipment, third information indicative of denial of the request for the admission into the cell cluster; and sending, to the first cell, the second cell, and the third cell, fourth information indicative of a penalty, wherein the penalty is utilized as input to respective models of the first cell, the second cell, and the third cell, and wherein the respective models are reinforcement learning based models.

\* \* \* \* \*